J. J. MADDEN.
LENS.
APPLICATION FILED DEC. 8, 1917.
1,263,333.
Patented Apr. 16, 1918.
2 SHEETS—SHEET 1
FIG.1.
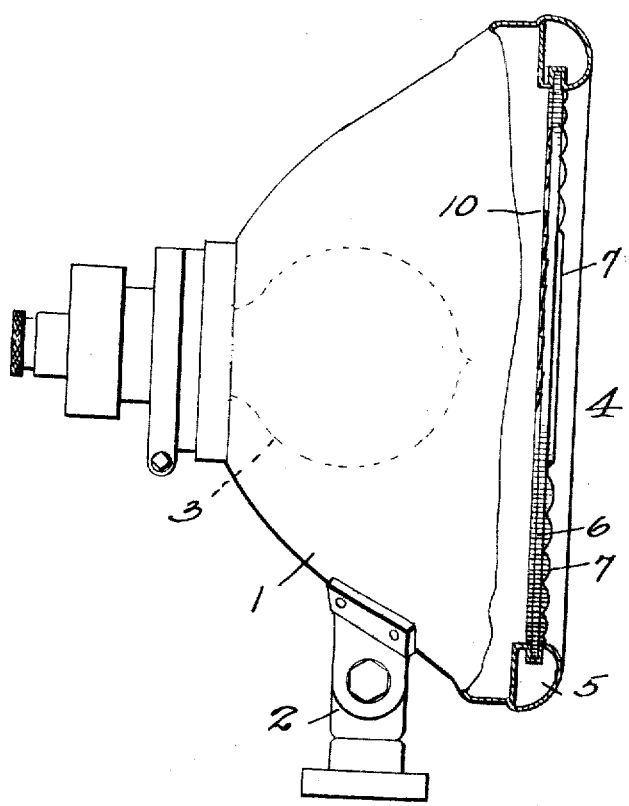
FIG.2.
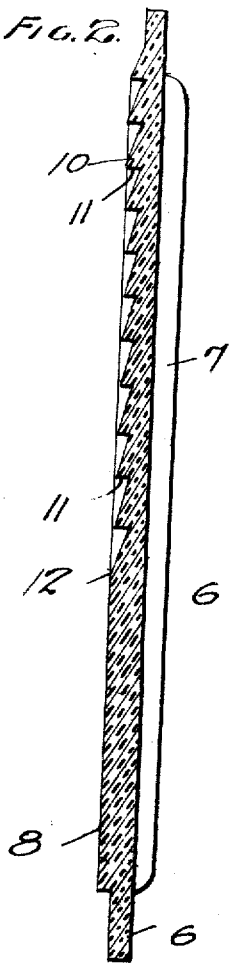
FIG.3.
INVENTOR
JAMES J. MADDEN
BY
Guy C. Clements
ATTORNEY

J. J. MADDEN.
LENS.
APPLICATION FILED DEC. 8, 1917.

1,263,333.

Patented Apr. 16, 1918.
2 SHEETS—SHEET 2.

INVENTOR
James J. Madden

BY
Guy C. Clements
ATTORNEY

UNITED STATES PATENT OFFICE.

JAMES J. MADDEN, OF ABERDEEN, SOUTH DAKOTA.

LENS.

1,263,333.   Specification of Letters Patent.   Patented Apr. 16, 1918.

Application filed December 8, 1917.   Serial No. 206,186.

*To all whom it may concern:*

Be it known that I, JAMES J. MADDEN, a citizen of the United States of America, residing at Aberdeen, in the county of Brown and State of South Dakota, have invented certain new and useful Improvements in Lenses, of which the following is a specification.

My present invention relates to an improved lens designed especially for use in the headlights of automobiles and other vehicles for the purpose of eliminating the undesirable and dangerous glare from the head-lights and for distributing the light rays in a strong, but not blinding nor dazzling light in front of the vehicle. By the utilization of my lens as a part of the head-light of an automobile, not only is the upward glare eliminated, thus preventing the blinding of pedestrians and others by an approaching car, but the non-glare light beam is concentrated in front of the moving automobile so that the way is clearly defined and a brightly illuminated area provided forward of and at the sides of the road.

The invention consists essentially in certain combinations and arrangements of flutings and prisms or prismatic ribs on the front and rear faces of the lens by means of which the light rays are refracted and reflected, as will be clearly set forth in the following specification and specifically pointed out in the claims.

In the accompanying drawings I have illustrated one complete example of the physical embodiment of my invention, which has been constructed and is now in use, according to the best mode I have so far devised for the practical application of the principles of the invention.

In the drawings:

Figure 1 is a view in side elevation of so much of an automobile headlight of standard type, as is necessary to illustrate the application thereto of my improved lens.

Fig. 2 is a vertical, transverse sectional view of the glass lens, on a larger scale than that shown in Fig. 1, and at line 2—2 of Fig. 4.

Fig. 3 is a horizontal, transverse view through the lens at line 3—3 of Fig. 4.

Figure 4:
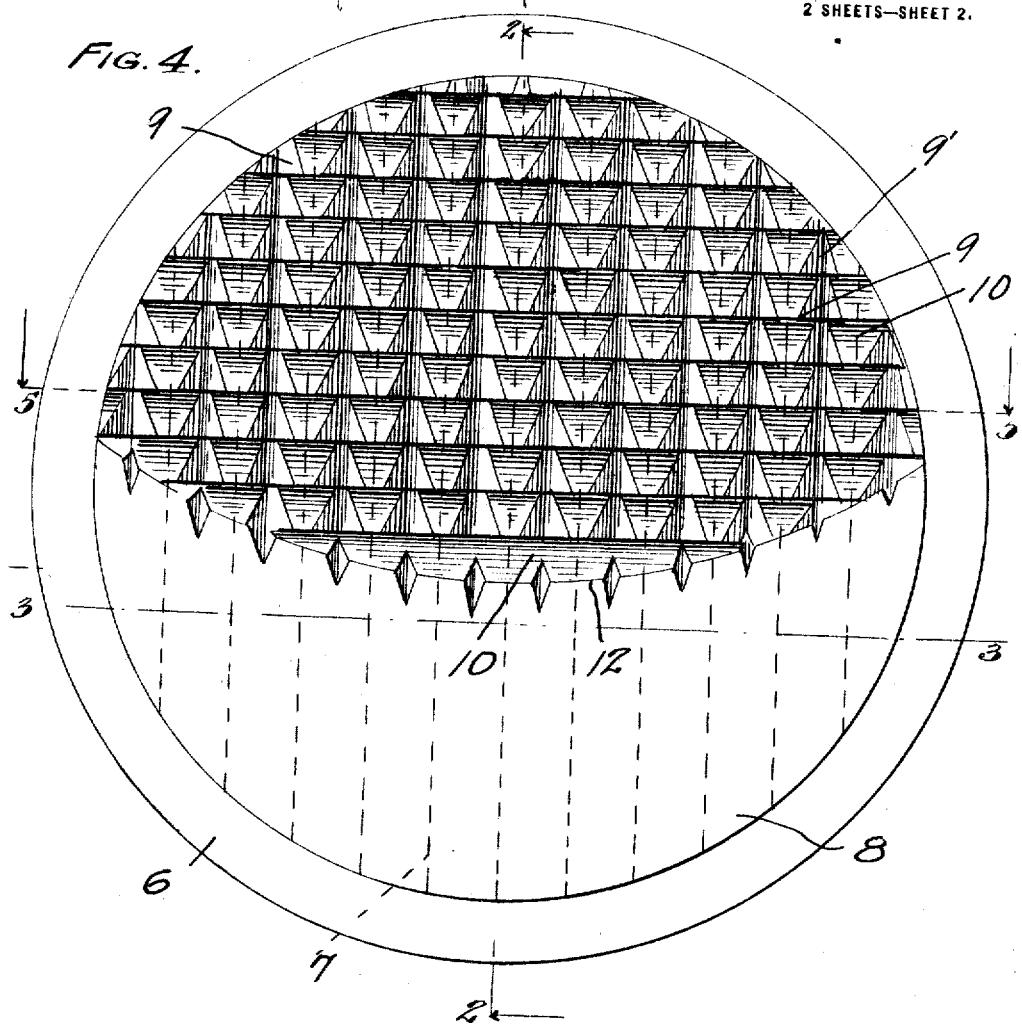
Fig. 4 is an inside or rear view of the lens.
Figure 5:
Fig. 5 is a horizontal, transverse sectional view of the lens at line 5—5 of Fig. 4.

In the preferred form of the invention illustrated in the drawings, which has proven highly satisfactory in actual use, I have shown the lens in connection with a customary type or form of lamp casing 1 provided with the standard 2 and, showing in dotted lines a lamp bulb 3 or other source of light, and of course the shell is equipped with the usual reflector, not indicated. Inasmuch as the lens may be used with any of the usual or standard forms of headlight or other lamps, it will be understood of course that I do not limit myself to this particular form illustrated, but I do confine myself to the improved lens as illustrated and depicted in the drawings and located, as at 4, at the front of the lamp casing or shell in Fig. 1.

Any usual form of lens supporting ring or rim 5 is employed at the front of the lamp casing to support the glass lens 6, as shown in Fig. 1, and the remaining figures are employed to show in detail the lens *per se*.

At the front or outer side of the lens are fashioned a series of convex flutes 7 which extend vertically of the lens and cover the entire front area for the purpose of giving a maximum amount of light and the distribution of light rays from the source of light, both directly ahead and laterally.

The lower portion of the rear or inner face of the lens is indicated at 8, as a smooth, or flat plane surface which portion adds thickness to the rear or inner lower portion of the lens back of the flutes or fluted front face so that the light rays are permitted to pass directly through the lens to the reflecting or refracting flutes or convex faces on the front of the lens where the rays are evenly distributed in a uniform beam of light emanating from the lower zone of the lens and illuminating the area directly ahead and to the sides of the lamp.

The upper portion of the rear face of the lens is broken up by the presence of a series of vertically disposed prismatic ribs 9 forming grooves 9' between them, and another series of horizontally disposed prismatic ribs 10 which provide shoulders with short horizontal faces 11, and these two series of ribs form prisms or facets covering the major portion of the rear or inner face of the lens extending from the top, and bounded by the curved line 12 at the bottom.

These prisms form refracting media for breaking up the light rays emanating from the source of light and for preventing upward travel of the light rays, thus eliminating an upward glare or dazzling light, while the lower portion of the lens permits the passage of light rays and the fluted front distributes, from the lower zone of the lens, a light beam forwardly and downwardly, to illuminate the way, the beam being well defined by the crescent shaped area or lower portion of the lens.

From the above description taken in connection with my appended drawings, it is evident that I have provided an improved lens that fulfils the purposes and objects set forth as the end to be attained in my invention, and having thus fully described the invention, what I claim is:—

A headlight lens having flutes covering its entire outer face, a lower portion of the rear face having a plane surface, and vertically and horizontally intersecting prismatic ribs forming prisms and covering the upper or remaining portion of the rear face.

In testimony whereof I affix my signature.

JAMES J. MADDEN.